Sept. 13, 1955     C. L. HOLDEMAN     2,717,470
FISH HOOK CONTAINER
Filed April 6, 1953     2 Sheets-Sheet 1
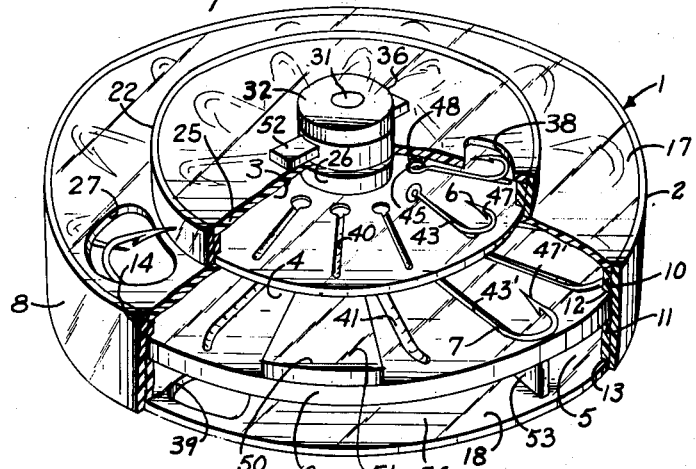

Sept. 13, 1955     C. L. HOLDEMAN     2,717,470
FISH HOOK CONTAINER

Filed April 6, 1953     2 Sheets-Sheet 2

INVENTOR.
Charles L. Holdeman.
BY
Fishburn & Mullendore
ATTORNEYS.

United States Patent Office 2,717,470
Patented Sept. 13, 1955

2,717,470
FISH HOOK CONTAINER

Charles L. Holdeman, Grandview, Mo.

Application April 6, 1953, Serial No. 346,922

9 Claims. (Cl. 43—57.5)

This invention relates to dispensing containers particularly for fish hooks and other fishermen's accessories. The principal object of the invention is to provide a container of this character for safely and conveniently enclosing fish hooks and which has means for selecting and presenting the hooks individually for easy removal.

Other objects of the invention are to provide one or more differentially-sized compartments, each for containing a given size of fish hooks respectively; to provide the container with compartments having a plurality of spaces for containing other fishermen's accessories, such as sinkers, swivels, and the like; and to provide the compartment having the spaces with a common closure which is rotatable coaxially of the fish-hook compartments to select an accessory from any one of the spaces; and to provide a container which is adapted for construction from transparent plastic material so that the contents may be visible through the walls of the container.

In accomplishing these and other objects of the invention, I have provided an improved structure, the preferred form of which is illustrated in the accompanying drawing wherein:

Fig. 1 is a perspective view of a container constructed in accordance with the present invention and showing parts thereof in section to better illustrate the construction.

Fig. 2 is a section through the container on a line 2—2 of Fig. 3.

Fig. 3 is a horizontal section through the container on the line 3—3 of Fig. 2.

Fig. 4 is a fragmentary section through the hub portion of the container illustrating the application of an additional compartment.

Fig. 5 is a fragmentary section on a line 5—5 of Fig. 2.

Figure 6:
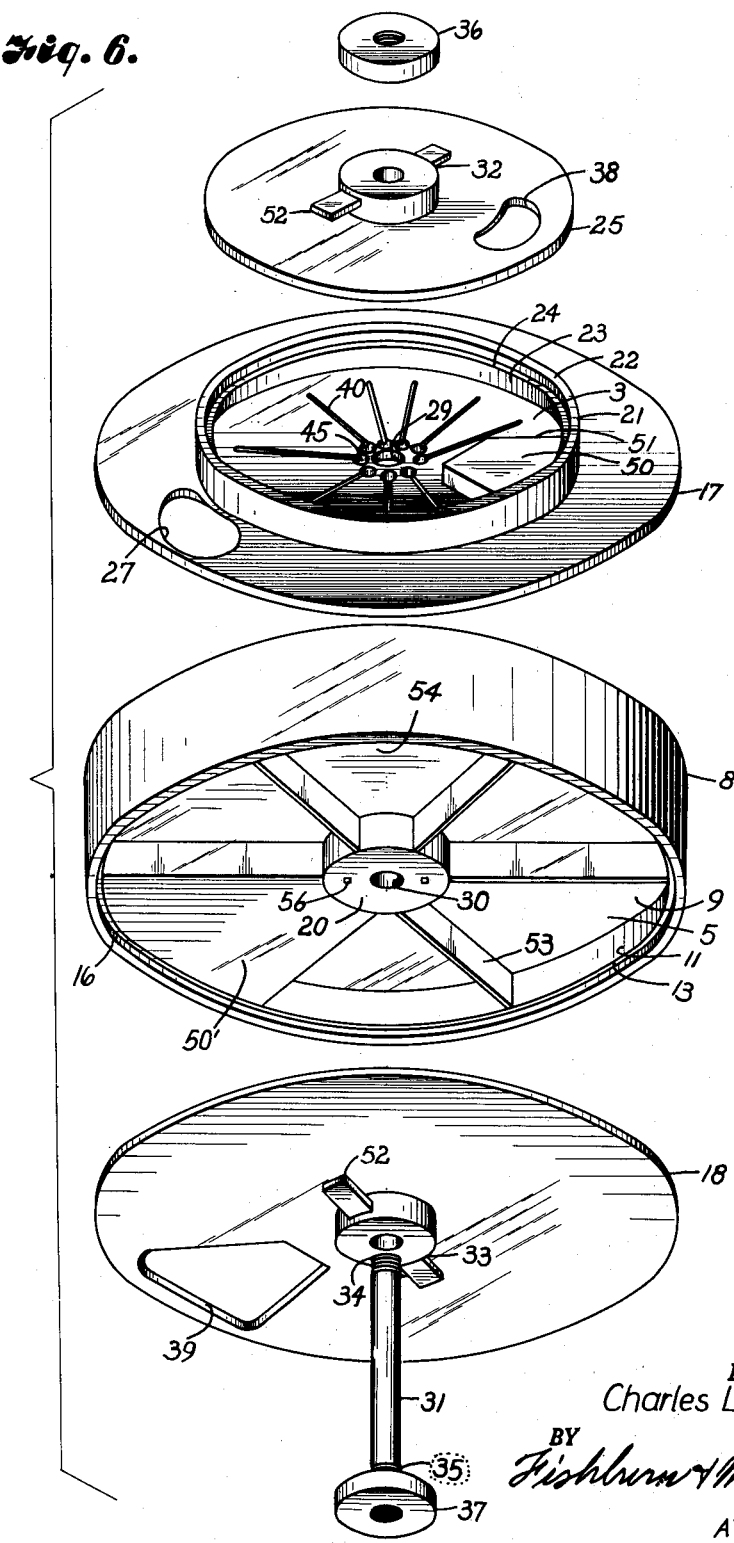
Fig. 6 is a perspective view of some of the parts of the container shown in Fig. 1 in disassembled spaced apart relation.

Referring more in detail to the drawings:

1 designates a container constructed in accordance with the present invention and which is adapted for enclosing and storing fish hooks in a safe and orderly arrangement. The container includes a casing 2 having a plurality of coaxial compartments 3, 4, and 5, the compartment 3 being adapted to contain relatively small size of fish hooks 6, the compartment 4 being adapted to retain a larger size of hooks 7, and the compartment 5 being adapted to contain various fishermen's small accessories such as sinkers, line swivels, and the like. The casing 2 includes a main outer wall portion 8 and a transverse disk portion 9, which may be formed integrally with the wall 8 or they may be formed separately from the wall 8 as shown in Fig. 2. Inset within the compartments 4 and 5 at the respective sides of the disk portion 9 are the vertically disposed spacer rings 10 and 11, which have edges 12 abutting against the periphery of the disk portion 9, and which have their opposite edges 13 terminating short of the outer edges 14 of the wall portion 8 to form annular shoulders for seating the edge of cover plates 17 and 18 that are of disk shape and are of a size to close the respective compartments 4 and 5. Cooperating with the rings 10 and 11 and located within the center of the disk portion 9 are spacing washers 19 and 20 to support the central portions of the cover plates 17 and 18.

The cover plate or disk 17 for the compartment 4 has an annular shoulder 21 of a shorter radius than the annular wall 8 to seat an annular wall portion 22 forming the periphery of the compartment 3. Inset within the wall 22 is a spacer ring 23 similar to the spacing rings 10 and 11 to provide an annular shoulder or seat 24 for a disk-shaped cover plate 25 of the compartment 3. The central portion of the cover disk 25 is spaced above the central portion of the cover disk 17 by a spacing washer 26. The wall 22, spacing washer 26, and ring 23 may be formed integrally with or cemented to the cover disk 17, since the wall 22, washer 26, ring 23 and cover disk 17 rotate as a unit in positioning an opening 27 in the cover plate or disk 17 relatively to fish hook locations within the compartment 4. The cover disks or plates 17, 18 and 25 as well as the washers 19, 20, and 26 have registering axial openings 28, 29, and 30 adapted to pass a shaft 31 therethrough. The ends of the shaft project through the cover disks or plates 18 and 25 and mounted thereon are collars 32 and 33, which are cemented or otherwise attached to the cover disks 18 and 25, respectively to serve as knobs to rotate the cover disks 18 and 25 on the shaft 31 as later to be described. The ends 34 and 35 of the shaft 31 are threaded to mount nuts 36 and 37 for retaining the parts in assembly. The cover disks or plates 18 and 25 have openings 38 and 39, respectively.

The fish hooks are located within the compartments 3 and 4 by means of recesses 40 and 41 that are formed within the disk portion 9 and upper face of the disk portion of the cover plate or disk 17 that forms the bottom of the compartment 3. These recesses comprise radial grooves corresponding in size and shape with the shanks 43 and 43' of the fish hooks 6 and 7 respectively. The inner ends of the radial grooves terminate in circular recesses 45 to accommodate the eyes 46 and 46' of the fish hooks therein. The barbed ends 47 and 47' of the fish hooks are in a plane extending at substantially at right angles with respect to the plane of the eyes so that when the hooks are positioned horizontally within the grooves with the barbed ends resting upon the bottoms of the compartments 3 and 4, the eyes are in substantially vertical planes with the upper portion of the eyes projecting above the upper faces of the bottoms of the compartments in position to be engaged by depending cams or lugs 48 and 49 that project downwardly from the under faces of the cover disks or plates 17 and 25 and in radial alignment with the openings 27 and 38, respectively. The openings 27 and 38 are amply wide relatively to the width of the cams 48 and 49 to permit a hook to be inserted after the lugs have been moved beyond one of the recesses within which the eye of a hook is to be received. In placing the hook, the eye end of the shank is passed through the opening in the cover with the eye thereof entering the recess on the rear side of the cams or lugs 48 or 49 as the case may be. In order to close the openings 27 and 38, the upper face of the disk portion 9 and the upper face of the disk or plate 17 have raised portions 50 provided with flat surfaces 51 which are in contact with the under faces of the cover disks or plates so that the openings 27 and 38 thereof are adapted to be closed thereby to retain the fish hooks in their proper position within the respective compartments. The collars 32 and 33 which form knobs as previously mentioned are provided with laterally extending wings 52, which may be readily grasped between the thumb and finger to facilitate rotation of the cover disks or plates 25 and 18 through their respective positions as later described. When one of the knobs is rotated the cover that is fixed thereto rotates with the knob but all other parts of the container are stationary.

The compartment 5 may be divided by radial partitions 53 to provide smaller spaces 54 for containing the small accessories, such as line sinkers and like devices. The opening of the cover plate or disk 18 registers with a raised portion 50' on the disk or cover plate 9 similar to the raised portions 50 previously described.

Other compartments may be connected with the casing, for example, a compartment 55 may be applied to the lower face of the cover disk or plate 18, in which case the washer 20 has recesses 56 for receiving lugs 57 on the inner face of the cover plate 18 which forms the bottom of the added compartment as shown in Fig. 4.

In using the device constructed and assembled as described, fish hooks 6 and 7 are inserted in their respective positions through the openings 27 and 38, as the case may be. For example, if the small fish hooks 6 are to be placed in the compartment 3, the cover plate is moved in an anticlockwise direction until the opening registers with the first of the hook recesses following the raised portion 50 in the compartment 3. The cover is moved until the lug or cam 48 thereon has just passed said first recess. This gives ample room for the eye end of the shank of the fish hook to be inserted through the opening 38 and properly positioned within the groove of the recess 40 with the barb end of the hook resting upon the bottom of the compartment and with the eye in substantially vertical position. After placement of the first hook the cover disk is advanced to the next recess and a hook is placed therein in a like manner. The operation proceeds until the last hook has been placed whereupon the cover disk is shifted to cause closure of the opening 38 by the raised portion 50. During rotation of the cover disk, the container is being supported in tthe palm of one hand with the fingers pressing against the wall 8 and the thumb pressing upon the top surface of the cover disk 17 so that only the cover disk 25 is rotated. The compartment 4 may be filled with fish hooks of larger size in a similar manner. However, the fingers of the hand which formerly were used in manipulating the knob when placing the fish hooks in the compartment 3 are now used in gripping the wall 22 for turning the cover disk 17 after the pressure of the thumb has been released therefrom. Ordinarily there is sufficient friction between the cover disk 25 and the wall 22 so that the wall 22, cover disk 25, washer 26 and collar 32 all turn as a unit. However, pressure may be applied against the cover disk 25 by the fingers of the hand which are not used in engaging the wall 22. When a hook is to be removed from the compartment 3, the container is gripped in one hand with the fingers engaging the wall 8 and the thumb pressing upon the cover disk 17. The fingers of the other hand are then used for engaging the knob for the cover disk 25 to rotate the cover disk in a clockwise direction, Figs. 1 and 3. When the lug or cam 48 engages the eye of the hooks, the eye is turned thereby and the barb end of the hook moves upwardly through the opening 38 so that it may be easily engaged between the finger and the thumb to lift the hook through the opening. If another hook of the same size is desired, the cover is advanced to bring the opening 38 into position for removing the next hook. If a hook is to be removed from the compartment 4, the container is held in the palm of one hand with the fingers engaging the wall 8. The thumb and first two fingers of the other hand then grip the wall 22 while the remaining fingers are pressed against the cover 25 to prevent independent turning thereof. In this way the wall 22, cover disk 17, washer 26, cover disk 25 and collar 32 all rotate as a unit. At the same time the wall 8 and the disk portion 9 which is connected thereto as well as the collars 19 and 20 remain stationary so that the opening 27 moves into registry with the first of the fish hooks when the pressure of the fingers on the wall 22 turn the cover disk 17 in a clockwise direction. During this movement the lug portion 49 engages the eye on the fish hook on the shank 43' of that hook to cause the shank to turn and lift the barb end through the opening 27 as shown in Figs. 1 and 2, whereupon it may be readily removed through the opening 27.

The accessories may be inserted into any one of the spaces in the compartment 5 by rotation of the cover plate 18 in either direction to register the opening 39 therein with the desired space 54. This is effected by turning the container upside down with the wall 22 and cover disk 25 resting in the palm of the hand and with the fingers engaging the wall 8. The container is thus held so that all parts thereof with the exception of the cover disk 18 are stationary. The knob formed by the collar 33 may then be grasped by the thumb and fingers of the other hand and rotated in either direction to bring the opening 39 so that it may be moved away from the raised portion 50' to bring the opening into registry with the desired space 54. Any article in that compartment may then be removed and with the container held as described the cover may be returned to its original position by turning the knob thereon to again bring the opening in closed position over the raised portion 50'.

Since the container has a plurality of different sizes of compartments such as 3 and 4 it is intended that only hooks of like size be placed in the respective compartments, therefore, there is no point in selecting the hooks in the respective compartments. The disks or cover plates are merely moved from a position where the openings 27 and 38 are closed to a position over the first hook in the respective compartments. The lugs 48 and 49 come into contact with the eye of the fish hook to cause the hook to turn and project the barbed end through one or the other of the openings, depending upon the size of the hook desired. After removal of the hook selected from one or the other of the compartments, the cover plate for that compartment is returned to the position where the opening is closed.

It will be noted in Fig. 2 that the shanks of the hooks are positioned within the recess 43 and that the barbed ends of the hooks are in close contact with the underface of the cover plates or disks. Also, there is insufficient room when the hooks are thus engaged for the eyes to move out of the recess 45, therefore, the hooks do not become dislodged until they are removed from the respective compartments in the manner above described.

It is pointed out that the cover plate 25 is easily turned relative to the compartment which is closed by gripping the wings 52 on the collar 32 and turning the collar in the proper direction which turns the cover plate 25 therewith, since the cover plate and collar are fixed together as above described. Ordinarily, there is sufficient friction to prevent turning of the cover plate 17, however, slight pressure of the thumb of the other hand on the cover plate 17 will prevent turning thereof and provide the relative movement for the cover plate 25. The cover plate 17 is readily turned by holding the container in one hand and engaging the wall portion 22 between the thumb and fingers of the other hand, in the manner of a knob, thus all tthe parts forming the compartment 3 turn with the cover plate and there is no disruption of the hooks within the compartment 3 when a hook is to be removed from the compartment 4.

It is also obvious that the shaft 31 merely serves as a spindle and as a tie to hold the parts of the container together.

From the foregoing it is obvious that I have provided a container which is adapted for safely retaining fish hooks of plural sizes and which may be readily manipulated to remove a desired hook. If the device is made of transparent material as above suggested, the hooks are readily observed through the transparency of the material.

I claim:

1. A container for fish hooks of the type including a shank, having an eye at one end and a hook at the other, with a hook being arranged at an angle with respect to the eye, said container including a case providing a compartment having a bottom, said bottom having means for retaining a shank of a hook and for supporting the eye in a plane substantially at right angles to said bottom when the hook end is resting upon said bottom, and means carried by the case and movable ovevr the fish hook to engage the eye and turn the shank in the retaining means for raising hook end from said bottom.

2. A container for fish hooks of the type including a shank, having an eye at one end and a hook at the other, with a hook being arranged at an angle with respect to the eye, said container including a case providing a compartment having a bottom having a recess in said bottom for containing the shank of a hook and supporting the eye in a plane substantially at right angles to said bottom when the hook end is resting upon said bottom, and means carried by the case and movable over the fish hook to engage the eye and turn the shank for raising hook end from said bottom.

3. A container for fish hooks of the type including shanks having eyes at one end and hooks at the other at an angle to the eyes, said container including a case providing a compartment having a bottom with recesses for supporting the hook shanks with the eyes in planes at substantially right angles to said bottom when the hook ends are resting upon said bottom, a cover means movably supported on the case and provided with means for successively engaging the eyes of the hooks to turn the shanks for raising the hook ends from said bottom.

4. A container for fish hooks of the type including shanks having eyes at one end and hooks at the other at an angle to the eyes, said container including a case providing a compartment having a bottom with recesses for supporting the hook shanks with the eyes in planes at substantially right angles to said bottom when the hook ends are resting upon said bottom, and a cover movably supported on the case and provided with a depending lug for successively engaging the eyes of the hooks to turn the shanks for raising the hook ends from said bottom, said cover having an opening through which the raised ends are caused to project for facilitating removal of the hooks from the container.

5. A container for fish hooks of the type including shanks having eyes at one end and hooks at the other at an angle to the eyes, said container including a case providing a compartment having a bottom with recesses for supporting the hook shanks with the eyes in planes at substantially right angles to said bottom when the hook ends are resting upon said bottom, a cover movably supported on the case and provided with a depending lug for successively engaging the eyes of the hooks to turn the shanks for raising the hook ends from said bottom, said cover having an opening through which the raised ends are caused to project for facilitating removal of the hooks from the container, and means within the case adapted to close the opening.

6. A container for fish hooks of the type including a shank having an eye at one end and a hook at the other at an angle to the eye, said container including a circular case having parts providing coaxial compartments of different diameters, covers rotatable over the compartments, the larger compartment having a relatively fixed bottom and the cover for the larger compartment forming the bottom of the smaller compartment, said bottoms having recesses for containing each of the shanks of the hooks and supporting the eyes in planes substantially at right angles to said bottoms when the hook ends are resting upon said bottoms, means for rotatably mounting the covers on the container, lugs on the covers depending into the respective compartments for successively engaging the eyes of the hooks to turn the shanks for raising the hook ends from said bottoms, and said movable covers having openings in alignment with the lugs through which the hook ends are adapted to project when in said raised position.

7. A container for fish hooks of the type including a shank having an eye at one end and a hook at the other at an angle to the eye, said container including a circular case having parts providing two coaxial compartments of different diameters, covers rotatable over the compartments, the larger compartment having a relatively fixed bottom and the cover for the larger compartment forming the bottom of the smaller compartment, said bottoms having recesses for containing each of the shanks of the hooks and supporting the eyes in planes substantially at right angles to said bottoms when the hook ends are resting upon said bottoms, means for rotatably mounting the covers, lugs on the covers depending into the respective compartments for successively engaging the eyes of the hooks to turn the shanks for raising the hook ends from said bottoms, and said movable covers having openings in alignment with the lugs through which the hook ends project when in said raised position, said cover for the larger compartment being adapted to be rotated by turning a part of the case forming the smaller compartment.

8. A container for fish hooks of the type including a shank having an eye at one end and a hook at the other at an angle to the eye, said container including a circular case having parts providing two coaxial compartments of different diameters, covers rotatable over the compartments, the larger compartment having a relatively fixed bottom and the cover for the larger compartment forming a bottom of the smaller compartment, said bottoms having recesses for containing each of the shanks of the hooks and supporting the eyes in planes substantially at right angles to said bottoms when the hook ends are resting upon said bottoms, means for rotatably mounting the covers, lugs on the covers depending into the respective compartments for successively engaging the eyes of the hooks to turn the shanks for raising the hook ends from said bottoms, said movable covers having openings in alignment with the lugs through which the hook ends project when in said raised position, said cover for the larger compartment being adapted to be rotated by turning a part of the case forming the smaller compartment, and means on the cover for the smaller compartment to rotate that cover independently of rotation of the cover for the larger compartment.

9. A container for fish hooks including a case providing a compartment for containing fish hooks and having an opening through which the fish hooks are removed, and movable means forming a part of said case and having a lug projecting into the compartment and adapted to engage a part of one of the fish hooks upon movement of said movable means for projecting a portion of a fish hook through said opening to facilitate removal thereof.

(References on following page)

References Cited in the file of this patent

UNITED STATES PATENTS

| | | |
|---|---|---|
| 908,338 | Sheble | Dec. 29, 1908 |
| 1,697,588 | Burt | Jan. 1, 1929 |
| 2,051,136 | Dormire | Aug. 18, 1936 |
| 2,076,157 | Perkins et al. | Apr. 6, 1937 |
| 2,148,721 | Avstreih | Feb. 28, 1939 |
| 2,242,059 | DeWitt | May 13, 1941 |
| 2,508,820 | Fraley | May 23, 1950 |
| 2,573,311 | Cupler II | Oct. 30, 1951 |

FOREIGN PATENTS

| | | |
|---|---|---|
| 15,223 | Great Britain | 1899 |
| 802,692 | Germany | Feb. 26, 1951 |